United States Patent
Medeiros et al.

(10) Patent No.: US 6,228,527 B1
(45) Date of Patent: May 8, 2001

(54) MAGNESIUM SOLUTION PHASE CATHOLYTE SEAWATER ELECTROCHEMICAL SYSTEM

(75) Inventors: Maria G. Medeiros, Bristol; Steven P. Tucker, Portsmouth, both of RI (US); James M. Cichon, Norwood; Russell R. Bessette, Mattapoisett, both of MA (US); Dwayne W. Dischert, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/267,905

(22) Filed: Mar. 2, 1999

(51) Int. Cl.[7] .............................. H01M 6/34; H01M 6/30
(52) U.S. Cl. ..................... 429/119; 429/118; 29/623.1; 29/623.5
(58) Field of Search ................................ 429/118, 119; 29/623.1, 623.5

(56) References Cited

U.S. PATENT DOCUMENTS

| | | | |
|---|---|---|---|
| 4,481,266 | * 11/1984 | Littauer et al. | 429/12 |
| 4,910,102 | * 3/1990 | Rao et al. | 429/51 |
| 4,927,717 | * 5/1990 | Turley et al. | 429/27 |
| 5,116,695 | * 5/1992 | Rao et al. | 429/12 |
| 5,162,168 | * 11/1992 | Downing et al. | 429/51 |
| 5,225,291 | * 7/1993 | Rao | 429/51 |
| 5,445,905 | * 8/1995 | Marsh et al. | 429/105 |
| 5,718,986 | * 2/1998 | Brenner | 429/105 |

* cited by examiner

Primary Examiner—Carol Chaney
Assistant Examiner—Tracy Dove
(74) Attorney, Agent, or Firm—Michael J. McGowan; Robert W. Gauthier; Prithvi C. Lall

(57) ABSTRACT

In accordance with the present invention, an electrochemical system is provided which comprises a plurality of cells, the cells being formed by spaced apart bipolar electrodes. Each of the electrodes is formed by an anode portion formed from a magnesium containing material and an electrocatalytic material joined to a surface of the anode. The electrodes are spaced such that the anode portion of one electrode faces the electrocatalytic material of the adjacent electrode. The electrochemical system also comprises a manifold system for introducing a seawater-catholyte solution into the spaces between the electrodes. An electrical connection is provided across the cells so as to initiate the reduction of the seawater-catholyte solution at the electrodes and to create electrical power. In a preferred embodiment, the seawater-catholyte solution is a seawater-hydrogen peroxide or seawater-sodium hypochlorite solution. A process for generating electrical power using the electrochemical system of the present invention is also described.

13 Claims, 2 Drawing Sheets

MAGNESIUM SOLUTION PHASE CATHOLYTE SEAWATER ELECTROCHEMICAL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE PRESENT INVENTION (1) Field of the Invention

The present invention relates to an electrochemical system, in particular a magnesium solution phase catholyte seawater electrochemical system, and to a process for generating electrical power using said system.

(2) Description of the Prior Art

Magnesium-seawater batteries have been developed, all of which include solid cathodes, including silver chloride, cuprous chloride, lead chloride, cuprous iodide, cuprous thiocyanate and manganese dioxide. Further, primary batteries employing aqueous electrolytes have been developed by various governmental and commercial laboratories in the U.S. and elsewhere since the 1940s. Emphasis has been placed on aluminum and magnesium anodes due to their high faradic capacity, low atomic weight, and high standard potentials. Of particular interest is their application to undersea vehicles as a result of the availability of seawater to act as an electrolyte or electrolyte solution, thus further enhancing their effectiveness as an energy source on a systems basis.

Magnesium/cuprous chloride and magnesium silver chloride were used as cathode materials in prior art battery systems. Eventually they were replaced with lower cost alternative cathodes such as lead chloride and manganese dioxide; but with equally lower specific energy. The development of higher specific energy systems included replacing magnesium with aluminum while retaining the silver oxide cathode. This enabled exceptional specific power and energy but with increased cost. To reduce the cost without compromising specific energy, the expensive silver oxide cathode was replaced with solution phase catholytes, such as hydrogen peroxide or sodium hypochlorite. These advancements are extremely promising by virtue of the reduced cost of materials while achieving specific energies upwards of 100 Wh/lb at current densities of 100–1200 mA/cm$^2$.

Other countries, notably Sweden and Norway, have successfully employed magnesium-seawater batteries whereby oxygen saturated in the seawater electrolyte is reduced on a catalytic cathode surface opposite the magnesium anode. This is highly efficient on a systems basis due to the fact that there is no sodium hydroxide required, greatly reducing the system weight. However, limited oxygen availability limits specific energies to under 100 Wh/lb.

Various types of batteries are shown in the patent literature. For example, U.S. Pat. No. 4,063,006 to Murphy illustrates an aqueous electrolyte battery in which liquid oxychlorides are fed to a cathode chamber. The oxychlorides flow through a porous carbon electrode. At the electrode, the oxychlorides are reduced and the reaction products dissolve in an aqueous electrolyte flowing by the face of the carbon electrode opposite to that in which the oxychlorides are introduced. Metal standoffs connect to the porous electrode for use as conductors while maintaining spacing in the cathode chamber.

U.S. Pat. No. 4,822,698 to Jackovitz et al. relates to a battery having an anode selected from the group consisting of magnesium, zinc, and mixtures and alloys thereof, an oxygen electrode as the cathode, and means for maintaining the anode and the cathode in an electricity generating relationship when the battery is placed in salt water. The '698 patent also describes a method of producing electricity by positioning the anode and cathode in a saline electrolyte.

U.S. Pat. No. 4,910,102 to Rao et al. relates to a battery assembly and a process for operating same. The battery assembly is comprised of bipolar electrodes disposed between an inert cathode current collector acting as a hydrogen electrode and an anode plate formed from material selected from the group consisting of aluminum, magnesium, aluminum alloys, magnesium alloys and mixtures thereof. The battery is configured for electrolyte flow wherein the electrolyte includes hydrogen peroxide in an amount sufficient to provide 0.5 to about 30 volume percent solution.

U.S. Pat. No. 4,910,104 to Rao et al. relates to a deferred actuated battery assembly comprised of a plurality of bipolar electrodes disposed between an inert cathode current collector acting as a hydrogen electrode and an anode plate formed from a material selected from the group consisting of aluminum, magnesium, aluminum alloys, magnesium alloys, and mixtures thereof and configured for electrolyte flow therebetween.

U.S. Pat. No. 5,314,766 to Witherspoon et al. relates to a lead acid battery electrode and a method of manufacturing same. The positive plates are prepared by forming partially oxidized tetrabasic lead sulfate having at least a part of the oxide portion in the form of alpha lead dioxide and forming beta lead dioxide. Next the oxidized tetrabasic lead sulfate and the beta lead dioxide are intermingled in a wet mixture. The wet mixture is applied to the oxidized surface of a lead support substrate. Then, it is heated and pressed for a time and at a temperature and compressive load sufficient to form an adhered or retained coating of active material on the substrate. The oxidized tetrabasic lead sulfate is formed by reaction of tetrabasic lead sulfate with magnesium hydroxide and sodium persulfate. Preferably, beta lead dioxide is formed by reacting red lead oxide with nitric acid to provide an oxidation product, at least a major portion of which is beta lead oxide, and which has a surface area of at least 10 m$^2$/gram.

U.S. Pat. No. 5,445,905 to Marsh relates to a dual flow battery comprising an aqueous hydrogen peroxide catholyte, an aqueous anolyte, a porous solid electrocatalyst capable of reducing the hydrogen peroxide and separating said anolyte, and an aluminum anode positioned within said anolyte. Separation of catholyte and anolyte chambers prevents hydrogen peroxide poisoning of the aluminum anode.

Many of these prior art batteries are expensive to manufacture and inordinately large. Further, many of these prior art batteries are unreliable.

SUMMARY OF THE INVENTION

Accordingly, it is an object of the present invention to provide an electrochemical system for generating electrical power which is particularly applicable to low current density, long endurance applications.

It is a further object of the present invention to provide an electrochemical system as above which is relatively small and less expensive to produce.

It is yet another object of the present invention to provide an electrochemical system as above which has increased reliability.

It is still another object of the present invention to provide an improved process for generating electrical power.

The foregoing objects are attained by the electrochemical system and the process of the present invention.

In accordance with the present invention, an electrochemical system is provided which comprises cells incorporating bipolar electrodes. Each of the electrodes is formed by an anode portion formed from a magnesium containing material and an electrocatalytic cathode substrate material joined to a back surface of the anode. The electrochemical system also comprises means for introducing a seawater-catholyte solution into a space between the anode portion of one bipolar electrode and the cathode portion of a second bipolar electrode to initiate the reduction of the seawater-catholyte solution at the electrodes and to create electrical power. In a preferred embodiment, the seawater-catholyte solution is a seawater-hydrogen peroxide or seawater-sodium hypochlorite solution.

The process for generating electrical power of the present invention broadly comprises providing cells incorporating bipolar electrodes with at least one of the electrodes comprising an anode portion formed from a magnesium containing material; mixing a solution containing seawater and a solution phase catholyte; and introducing the seawater-catholyte solution into a space between the anode portion and cathode portion of the bipolar electrodes to initiate the reduction of the seawater-catholyte solution at the electrodes and to create electrical power.

Other details of the electrochemical system and the process of the present invention, as well as other objects and advantages attendant thereto, are set forth in the following detailed description and the accompanying drawings, wherein like reference numerals depict like elements.

DESCRIPTION OF THE PREFERRED EMBODIMENT(S)

Figure 1:
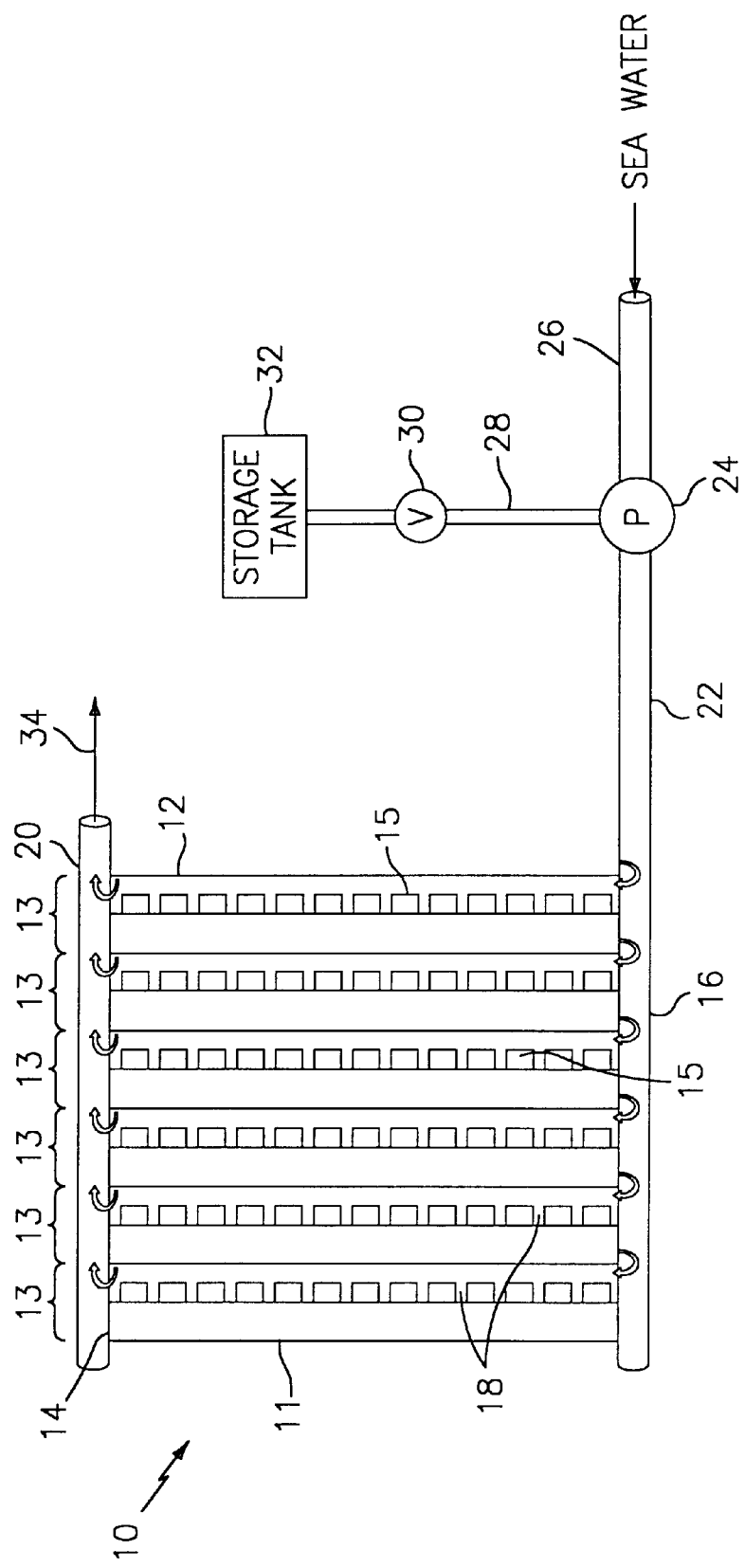
FIG. 1 is a schematic representation of an electrochemical system in accordance with the present invention.

Referring now to the drawings, FIG. 1 illustrates an electrochemical system 10 in accordance with the present invention. The electrochemical system 10 is formed by a plurality of components including a cathode end plate 11 formed from a suitable metal or metal alloy such as silver or a silver alloy, an anode end plate 12 formed from a suitable metal or metal alloy such as magnesium or a magnesium alloy, and a plurality of spaced apart bipolar electrodes 14 positioned between the cathode end plate 11 and the anode end plate 12 forming a plurality of cells 13. Each cell 13 further includes a separator system, picots 15, for insuring separation between the electrodes. The separator system picots 15 is preferably formed by a plurality of spaced apart separators made of an epoxy-based material such as URALITE as manufactured by HEXCEL Chemical Products of Chatsworth, Calif.

A distribution manifold 16 is provided for introducing an aqueous electrolyte into the spaces 18 formed between adjacent electrodes 14, between the cathode end plate 11 and a respective one of the electrodes 14, and between the anode end plate 12 and a respective one of the electrodes 14. An outlet manifold 20 is provided for removing spent electrolyte from the spaces 18.

The distribution manifold 16 is in fluid communication via line 22 with a pump 24 connected on a suction side by a line 26 with a source of an electrolyte such as sea water. Also connected by a line 28 under the control of a valve 30 to the suction side of the pump 24, there is provided a storage tank 32 containing a solution phase catholyte, preferably selected from the group consisting of hydrogen peroxide, sodium hypochlorite and mixtures thereof. The valve 30 allows solution phase catholyte to be supplied at a desired rate of flow depending on the application. The solution phase catholyte is preferably admixed with the seawater electrolyte and supplied to the spaces 18 via the distribution manifold 16.

The manifolds 16 and 20 provide for a substantially uniform flow of the electrolyte through the electrochemical system 10 and the collection and discharge of electrolyte via line 34 connected to the outlet manifold.

In a preferred construction of the present invention, the cathode end plate 11 and the anode end plate 12 form part of a casing (not shown) such that electrodes 14 are placed within the casing. Additionally, the cathode end plate 11 and the anode end plate 12 are each connected to a busbar (not shown) which is connected to a variable load (not shown) in a known manner.

Figure 2:
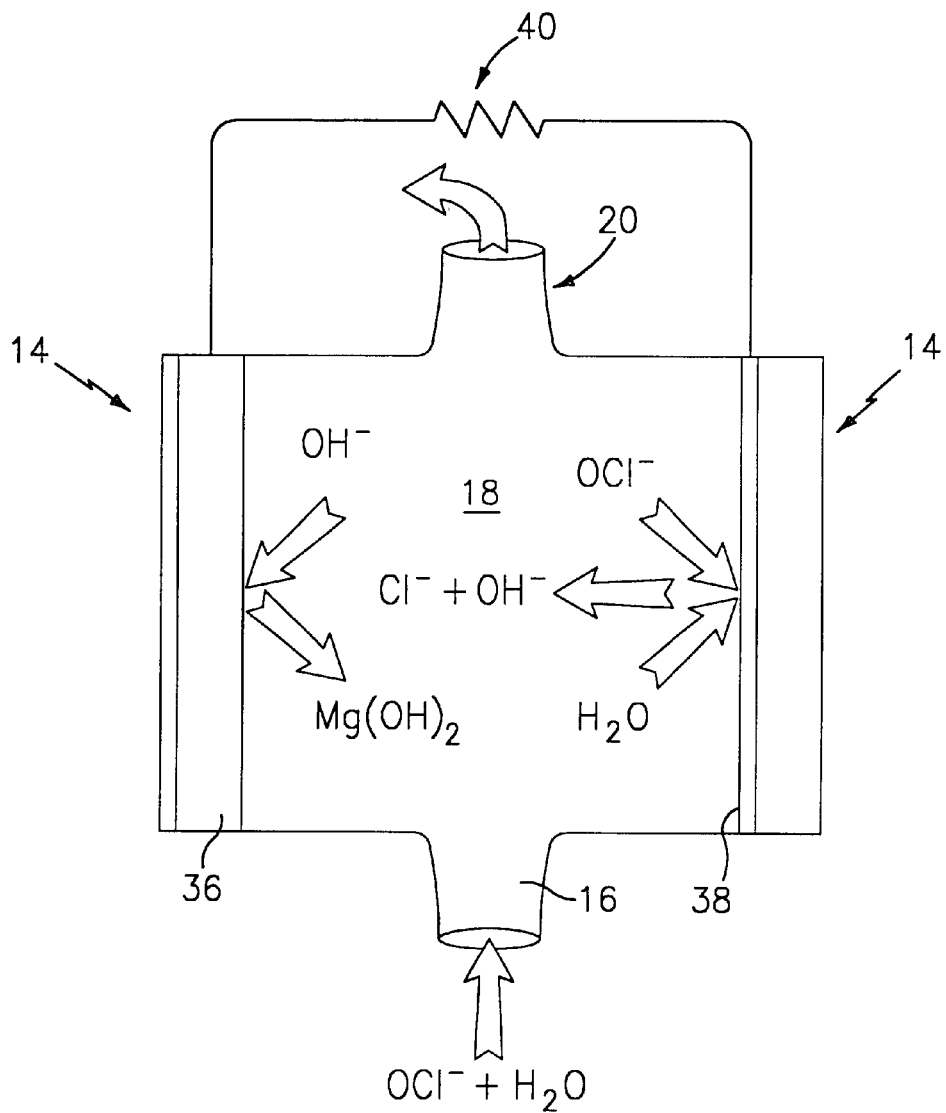
FIG. 2 is an enlarged view of a single cell showing the bipolar electrodes and showing the reactions which take place at the anode surface and at the electrocatalyst cathode surface for a seawater-sodium hypochlorite catholyte solution.

As shown in FIG. 2, each of the bipolar electrodes 14 is formed by an anode portion 36 plated with conductive substrate and electrocatalyst 38. The anode portion 36 is preferably formed from a material selected from the group consisting of magnesium and magnesium alloys. The electrocatalyst 38 is preferably formed from a material capable of carrying out the reduction of the catholyte and of forming a conductive substrate. Suitable materials for the electrocatalyst include silver, nickel, and carbon materials and alloys thereof.

In operation, electrical connection (not shown) is made to the cathode end plate 11 and the anode end plate 12 to initiate the reduction of the solution phase catholyte. A mixture of the solution phase catholyte and the seawater electrolyte, giving catholyte concentrations in the range of 0.1 molar to 1.0 molar, is fed into each space 18 via manifold 16. The desired mixture is created by causing the solution phase catholyte to flow from the concentrated source at a rate of from about 2 lpm to about 4 lpm and mix with the seawater. The mixture of the solution phase catholyte and the seawater electrolyte is then fed into the spaces 18 at a rate in the range of from about 10 lpm to about 25 lpm.

The resulting magnesium solution phase couples are achieved:

|  | E° |
|---|---|
| (1) Magnesium-Hydrogen peroxide System (Mg—$H_2O_2$): | |
| Anode: Mg -----> $Mg^{2+}$ + 2e– | 2.70 V (1) |
| Cathode: $HO_2^-$ + $H_2O$ + 2e– -----> $3OH^-$ | 0.88 V (2) |
| Cell Reaction: Mg + $HO_2^-$ + $H_2O$ -----> $Mg^{2+}$ + $3OH^-$ | 3.58 V (3) |
| (2) Magnesium-Hypochlorite System (Mg—$OCl^-$): | |
| Anode: Mg -----> $Mg^{2+}$ + 2e– | 2.70 V (4) |
| Cathode: $OCl^-$ + $H_2O$ + 2e– -----> $Cl^-$ + $2OH^-$ | 0.90 V (5) |
| Cell Reaction: Mg + $OCl^-$ + $H_2O$ ----> $Mg^{2-}$ + $Cl^-$ + $2OH^-$ | 3.60 V (6) |

The theoretical charge capacities and energy densities for several electrochemical couples are listed below in Table I for comparison purposes. It is evident that the magnesium-hydrogen peroxide and the magnesium-sodium hypochlorite systems of the present invention have higher theoretical potentials and higher corresponding charge capacities and energy densities in comparison with established magnesium and aluminum systems

TABLE I

| SYSTEM | CELL POTENTIAL (Theoretical) | CHARGE CAPACITY* | ENERGY DENSITY* |
| --- | --- | --- | --- |
| Al - $H_2O_2$ | 3.23 V | 2.10 Ahr/g | 6.78 Whr/g |
| Al - NaOCl | 3.25 V | 1.54 Ahr/g | 5.01 Whr/g |
| Al - AgO | 2.92 V | 0.60 Ahr/g | 1.75 Whr/g |
| Mg - $H_2O_2$ | 3.58 V | 1.87 Ahr/g | 6.69 Whr/g |
| Mg - NaOCl | 3.60 V | 1.42 Ahr/g | 5.11 Whr/g |
| Mg - AgCl | 2.92 V | 0.35 Ahr/g | 1.02 Whr/g |
| Mg - CuCl | 2.84 V | 0.48 Ahr/g | 1.36 Whr/g |

*THEORETICAL (per mass of reactants (grams))

The resulting electrical output as shown in FIG. 2 may be used to power a desired load 40.

It has been found that the magnesium-hydrogen peroxide or magnesium-sodium hypochlorite electrochemical systems of the present invention are useful for very low rate, 10 to 50 $mA/cm^2$, long endurance (greater than four hours and up to forty hours) systems.

It has also been found that the performance of the electrochemical couple is effected by temperature and electrolyte flow rates. With regard to temperature, it has been found that current densities approaching 100 $mA/cm^2$ with corresponding cell potentials of 1.0 Volt can be achieved at a temperature of 60° C. At room temperature, it has been found that a cell potential of 0.8V at 100 $mA/cm^2$ can be achieved. The electrolyte flow rate is optimized to achieve maximum electrochemical efficiency, e.g., low flow rates for low rate systems and higher flow rates for high rate (100 $mA/cm^2$) systems.

One of the advantages to the electrochemical systems of the present invention is a significant reduction in size on a system basis. The reduction in size comes about from the fact that a caustic/sodium hydroxide storage tank is not necessary since seawater from the ocean is being used to activate the magnesium. The elimination of the sodium hydroxide enables an increase of 50% in specific energies, thus to 250 Wh/lb, or 6–7 times that of silver zinc. Another advantage over current technology is the reduced cost over the present state of the cathode materials (sodium hypochlorite or hydrogen peroxide vs. silver oxide cathodes). Still another advantage is the increased reliability.

While it is preferred to form the anode portion 36 from magnesium or a magnesium alloy, it is also possible to form the magnesium alloy by replacing a portion of the magnesium with lithium, calcium or aluminum.

It is apparent that there has been provided in accordance with the present invention a magnesium solution phase catholyte seawater electrochemical system which fully meets the objects, advantages, and means set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. Process for creating electrical power comprising the steps of:

providing at least two spaced apart bipolar electrodes, each bipolar electrode having an anode side formed from a magnesium containing material and having an electrocatalyst side, adjacent electrodes arranged to have the anode side of one electrode facing the electrocatalyst side of the adjacent electrode;

mixing a solution containing seawater and a solution phase catholyte at a catholyte flow rate of from about two liters per minute to about four liters per minute;

introducing said seawater-catholyte solution into a space between said electrodes at a rate of from about 10 liters per minute to about 25 liters per minute; and providing an electrical connection between the anode side of one electrode and the electrocatalyst side of the adjacent electrode so as to initiate the reduction of said seawater-catholyte solution at the electrodes and to create electrical power.

2. The process of claim 1 wherein said mixing step comprises mixing hydrogen peroxide with said seawater so as to form a solution having catholyte concentrations in a range from about 0.1 M to about 1.0 M.

3. The process of claim 1 wherein said mixing step comprises mixing sodium hypochlorite with said seawater so as to from a solution having catholyte concentrations in a range from about 0.1 M to about 1.0 M.

4. The process of claim 1 wherein:

said electrode providing step comprises providing an anode end plate and a cathode end plate, the at least two electrodes placed between the anode and cathode end plates, the anode end plate being spaced apart from an electrocatalyst side and the cathode end plate being spaced apart from an anode side;

said introducing step comprises introducing said seawater-catholyte solution into spaces between said anode end plate, said cathode end plate and said electrodes; and said electrical connection providing step comprises providing an electrical connection between said anode end plate and said cathode end plate.

5. The process of claim 1 wherein said electrical connection providing step further comprises:

providing a variable load across said electrical connection; and varying the load to achieve current densities in a range of from about 5.0 $mA/cm^2$ to about 150 $mA/cm^2$.

6. An electrochemical system for generating electrical power comprising:

a cell having two spaced apart electrodes;

each of said electrodes being formed by an anode portion formed from a magnesium containing material and an electrocatalytic material joined to a surface of said anode;

means for mixing a catholyte with seawater at a catholyte flow rate in the range from about two liters per minute to about four liters per minute to obtain a seawater-catholyte solution with a catholyte concentration in a range from about 0.1 M to about 1.0 M;

means for introducing the seawater-catholyte solution into a space between said electrodes at a flow rate in the range from about 10 liters per minute to about 25 liters per minute; and an electrical connection between said electrodes, the connection initiating the reduction of the seawater-catholyte solution at the electrodes to create electrical power.

7. The electrochemical system of claim 6 wherein each said anode portion is formed from magnesium.

8. The electrochemical system of claim 6 wherein each said anode portion is formed from a magnesium alloy.

9. The electrochemical system of claim 6 further comprising:
   an anode end plate; and
   a cathode end plate, said spaced apart electrodes being positioned intermediate said anode end plate and said cathode end plate.

10. The electrochemical system of claim 9 wherein the electrical connection is connected to said anode end plate and said cathode end plate.

11. The electrochemical system of claim 6 wherein said means for introducing said seawater-catholyte solution comprises means for mixing a seawater-hydrogen peroxide solution and introducing same into said space.

12. The electrochemical system of claim 6 wherein said means for introducing said seawater-catholyte solution comprises means for mixing a seawater-sodium hypochlorite solution and introducing same into said space.

13. The electrochemical system of claim 6 further comprising means for removing spent seawater-catholyte solution from said space.

* * * * *